United States Patent
Heim et al.

(10) Patent No.: US 8,616,041 B2
(45) Date of Patent: Dec. 31, 2013

(54) METHOD FOR CALIBRATING A SENSOR SYSTEM OF A MEASURING BEARING FOR A BEARING INSTALLATION

(75) Inventors: Jens Heim, Bergrheinfeld (DE); Peter Niebling, Bad Kissingen (DE); Gottfried Ruoff, Oberwerrn (DE); Darius Dlugai, Schweinfurt (DE); Christian Mock, Bergrheinfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 986 days.

(21) Appl. No.: 11/995,080

(22) PCT Filed: Jul. 1, 2006

(86) PCT No.: PCT/DE2006/001143
§ 371 (c)(1),
(2), (4) Date: Jan. 25, 2008

(87) PCT Pub. No.: WO2007/006261
PCT Pub. Date: Jan. 18, 2007

(65) Prior Publication Data
US 2008/0209979 A1 Sep. 4, 2008

(30) Foreign Application Priority Data
Jul. 9, 2005 (DE) .................. 10 2005 032 223

(51) Int. Cl.
*G01D 18/00* (2006.01)

(52) U.S. Cl.
USPC .......................................... 73/1.15

(58) Field of Classification Search
None
See application file for complete search history.

(56) References Cited

U.S. PATENT DOCUMENTS

| | | | |
|---|---|---|---|
| 4,625,567 A | 12/1986 | Frayer, Jr. | |
| 4,763,508 A * | 8/1988 | Buck | 73/9 |
| 5,952,587 A * | 9/1999 | Rhodes et al. | 73/862.541 |
| 6,766,697 B1 | 7/2004 | Perez | |
| 2007/0186687 A1 * | 8/2007 | Haaser et al. | 73/862.06 |

FOREIGN PATENT DOCUMENTS

DE    199 37 203    3/2000

* cited by examiner

*Primary Examiner* — Robert R Raevis
(74) *Attorney, Agent, or Firm* — Lucas & Mercanti, LLP

(57) ABSTRACT

The invention relates to a method for calibrating a sensor system of at least one measuring bearing for a bearing installation, said method being used to adjust individual measured values of an individual bearing installation using representative reference values of a reference installation.

7 Claims, No Drawings

METHOD FOR CALIBRATING A SENSOR SYSTEM OF A MEASURING BEARING FOR A BEARING INSTALLATION

FIELD OF THE INVENTION

The invention relates to a method for calibrating a sensor system of at least one measuring bearing for a bearing installation, with which method individual measured values of an individual bearing installation are adjusted using representative reference values of a reference installation.

BACKGROUND OF THE INVENTION

Calibration is a task for determining the relationship between the output values of a measuring apparatus, a measuring device, values represented by a material measure or a reference material and the associated values, which are defined by standards, of a measurement variable under predefined conditions.

DE 199 37 203 A1 provides for the calibration of a measuring bearing during mounting. Specifically, the intention is for a sensor system made up of strain gages gauges to determine load components of the bearing on the basis of stresses resulting from rolling contact. The aim is to calibrate the bearing as realistically as possible. Therefore, provision is also made for the bearing to be calibrated with a preload during mounting.

In order to determine the reference values, a comparison installation/reference installation with defined individual influencing variables is provided. The influencing variables on the bearing, which are to be measured, are for example:
the overlap in press fits resulting from diameter differences in the bearing seat,
temperatures,
stresses resulting from loads,
stresses resulting from Hertzian stress during rolling contact,
vibrations,
dimensional deviations within the permissible production tolerances.

Influencing variables of this type are always superimposed with disturbance variables during real individual mounting. Disturbance variables are, for example, also those which are also to be assigned to the group of the above-mentioned influencing variables. During calibration, these disturbance variables have a disadvantageous effect on the result of the calibration operation, that is to say also on the measured values, since they may corrupt the measurement result.

Measured values are variables which result from the influences, such as stresses resulting from overlaps. The reference values provided in relation to the measured values are standard values which are determined on the basis of a representative group of individual values. The reference values have the same physical unit as the specific measured values.

Although a preload is applied in the method according to DE 199 203 A1, the bearing is rotated in a defined manner in the installation and therefore, during adjustment, the inherent weight of the structure to be mounted is taken into account relatively accurately, however, for example the influence of the press fits resulting from the bearing seat is not included in the reference value.

An installation also has further disturbance variables which cannot be reproduced on a comparison installation or can be reproduced only with a great deal of outlay. These are, in particular, influences from the surrounding structure (device) which are subject to fluctuations in terms of behavior and structure. Influences of this type are, for example, fluctuations in the thickness of the material or defects in the material. Influences of this type can, for example, strongly influence the vibration behavior or the transmission of vibrations. Further disturbing influences are vibrations from assembly devices and other production devices in the vicinity of the bearing to be calibrated. Under certain circumstances, the influences severely corrupt the results. This can lead to incorrect assessment of measurement results.

Calibrating each individual bearing in the installation is relatively complicated and, as already mentioned, is susceptible to disturbing influences. To some extent, calibration is possible only with great difficulty or is not possible at all on account of the inability to access the mounted bearing. Vehicle manufacturers therefore often refrain from using measuring bearings, for example in vehicle transmissions.

SUMMARY OF THE INVENTION

The object of the invention is therefore to provide a method for calibrating the sensor system of a measuring bearing, which method is easy to implement and in which the influencing variables on measured values of the bearing are taken into account during calibration as realistically as possible.

The invention provides a method for calibrating a sensor system of at least one measuring bearing for a bearing installation, in which method individual measured values of an individual bearing installation are calibrated using representative reference values of a reference bearing installation before installation of the measuring bearing. It is important here that the mounting conditions are simulated on the bearing, which is not yet mounted in the machine, the transmission or the like, and the sensor system is then calibrated.

The method is therefore used to calibrate roller bearings, in which the measurement effect is influenced by the overlap of the inner ring and/or outer ring by way of the corresponding bearing seat, before mounting into the bearing seat or onto the bearing seat.

Overlaps are the intended diameter differences with which a press fit is generated on the bearing seat. These overlaps result in stresses in the bearing ring. Under certain circumstances, these stresses superimpose or corrupt, on the mounted bearing, the stresses resulting from rolling contact. If, during operation of the bearing, for example with a sensor system made up of strain gages gauges, the stresses resulting from rolling contact are to be determined, the influences of the press fit are taken into account during calibration in accordance with the features of the method according to the invention.

On the inner rings, the press fit is simulated by means of a clamping mandrel. On the outer rings, the press fit is simulated, for example, by means of clamping tongs or a clamping ring. To this end, the individual, that is to say specific, diameter of the bearing ring is first measured. Further influences of the bearing installation, for example, the diameter of the housing bore or of the shaft seat, are measured. Mounting is then simulated outside the actual bearing installation using suitable tools and the sensor system is calibrated.

The method according to the invention makes it possible to produce precalibrated measuring bearings, measuring bearing systems and bearing units, even as early as at the manufacturer's premises. Individual cost-intensive calibration and also testing of the functional capability of the bearing on the assembly line at the customer's premises can be dispensed with. It is possible to define clear assignment of responsibilities, for example with a view to possible warranties between the customer and supplier.

The individual influencing variables usually lie within a tolerance zone. The permissible tolerance zone is determined on the basis of the required production- and assembly-related tolerances. In the absence of specific values of the bearing installation from the manufacturer of the measuring bearings, such as the inside diameter of the housing seat or the outside diameter of the shaft seat for the measuring bearing, classes of calibrated bearings are produced by the manufacturer of the measuring bearing in a targeted manner. The tolerance zone between the maximum permissible value and the minimum permissible value is first subdivided into a defined number of groups. The proportion of the influencing variables which can be determined on the bearing to be calibrated is then determined. Following this, installation is then simulated on the bearing, taking into account one of the groups, and the bearing is calibrated. The bearing is therefore allocated to a class of calibrated measuring bearings which is related to the respective group. Before assembly of the measuring bearing in the specific installation, the specific value of the installation is then determined, assigned to the corresponding group and then, on the basis of the group measuring bearings from the corresponding class, allocated.

The invention claimed is:

1. A method for calibrating a sensor system of at least one measuring bearing for a bearing installation and for installing the at least one measuring bearing, the method comprising:
    obtaining an individual measured value of the at least one measuring bearing;
    simulating the influences of the bearing installation by adjusting influencing variables on the at least one measuring bearing using representative reference values of a reference bearing installation, and based on the individual measured value;
    calibrating the sensor system during the step of simulating; and
    installing the measuring bearing into the bearing installation after the sensor system is calibrated;
    wherein the influences are influences of a press fit at a bearing seat due to diameter differences in the bearing installation.

2. The method of claim 1, wherein the diameter differences lie within a tolerance zone defined by maximum permissible and minimum permissible diameter differences within the bearing installation.

3. The method of claim 1, wherein the step of obtaining further comprises the following steps in sequence:
    determining the specific diameters of the bearing installation, which influence the press fit; and
    calculating the diameter differences based on the determined diameters; and
    wherein the step of simulating comprises simulating the press fit, which is determined from the diameter differences on the measuring bearing before mounting.

4. The method of claim 1, wherein stresses are measured as the measured values, the stresses being mechanical stresses resulting from the diameter differences; and the stresses being adjusted using reference stresses.

5. The method of claim 4, wherein the reference stresses result from a reference press fit, the reference press fit representing a largest possible quantity of press fits from the diameter differences which lie within a tolerance zone.

6. The method of claim 1, wherein the sensor system has at least one strain-measuring sensor system.

7. The method of claim 1, further comprising the following steps of:
    subdividing a tolerance zone into at least two groups of partial tolerance zones;
    defining a group reference value for each of the groups, with the group reference value representing measurable influences on the bearing installation assigned to one of the groups;
    determining the influences from a specific individual bearing installation, into which the measuring bearing is to be installed after calibration before mounting of the measuring bearing;
    assigning the measuring bearing to one of the groups on a basis of previously determined specific influences from the individual bearing installation of the measuring bearing;
    wherein the step of simulating comprises simulating the specific influences on the measuring bearing and the measured value, which relates to the individual bearing installation of the measuring bearing, is determined before installation of the measuring bearing; and
    wherein the step of simulating comprises adjusting the sensor system using the group reference value of one of the groups to which the individual bearing installation of the measuring bearing is assigned.

* * * * *